Patented June 24, 1930

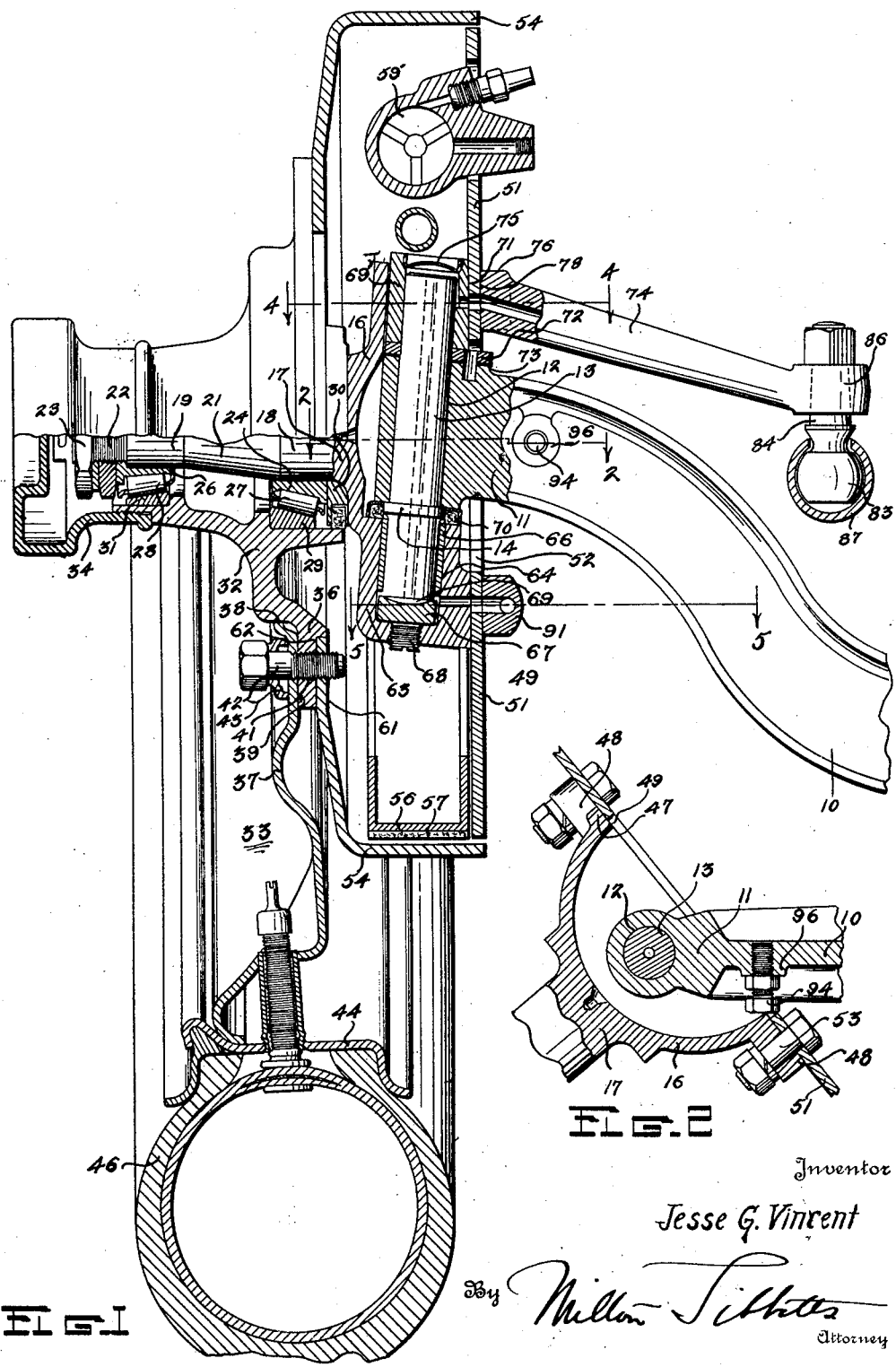

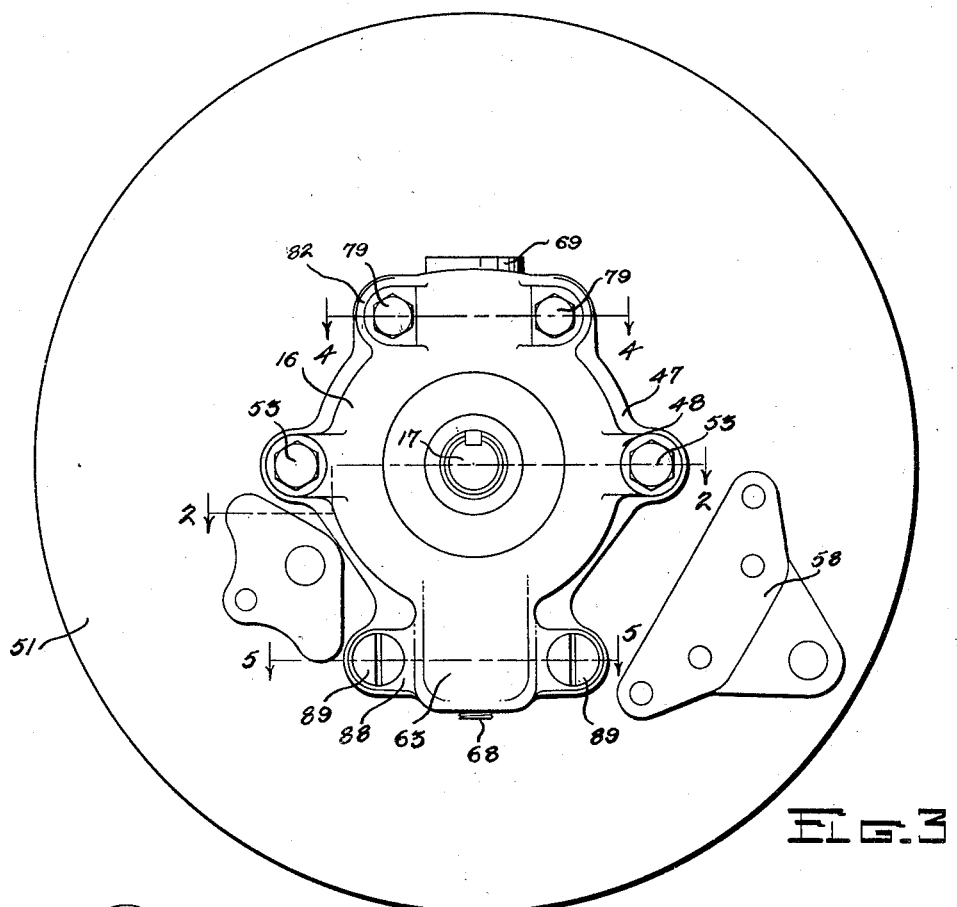
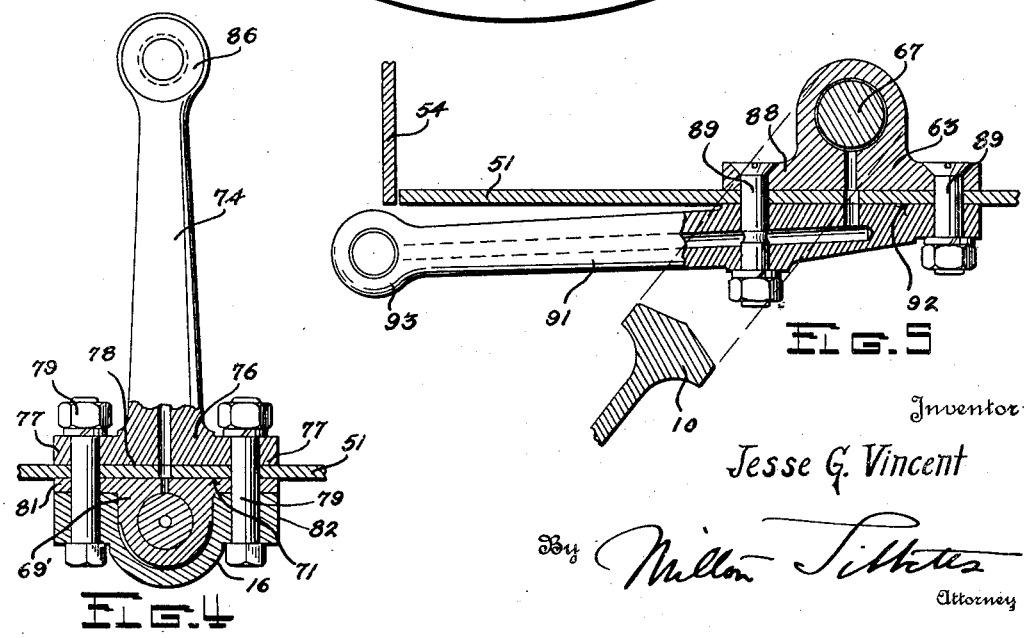

1,766,859

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed May 9, 1925. Serial No. 29,016.

This invention relates to motor vehicles and particularly to the mounting of the front or steering wheels of such vehicles. It has for one of its objects to provide a steering connection between the front axle and the steering wheels of a motor vehicle which shall be simpler, stronger, and less expensive to manufacture than such connections now in use.

Another object of the invention is to provide a steering gear and axle assembly, especially adapted for use in a four wheel braking system, in which the brake supporting element shall be securely clamped between the movable part of the assembly and the steering lever arms.

A further object of the invention is to provide such a steering connection which may be quickly and easily assembled, disassembled and adjusted.

Other objects of the invention will appear from the following description taken in connection with the drawings, which form a part of this specification, and in which:

Fig. 1 is a view partially in elevation and partially in vertical section through a wheel and axle assembly constructed in accordance with the invention;

Fig. 2 is a view in section substantially on the line of 2—2 of Fig. 1, the wheel being shown in a different position than in Fig. 1;

Fig. 3 is a view in side elevation of the exterior of the steering knuckle housing with the wheel and bearings removed; and Figs. 4 and 5 are detail views, partially in section substantially on the lines 4—4 and 5—5 respectively of Figs. 1 and 3.

Referring to the drawings, at 10 is shown the front axle of a motor vehicle having an upturned end portion terminating in an eye or knuckle member 11. The bore 12 of the eye 11 is somewhat inclined to the vertical when the axle 10 is in its normal horizontal position, and is provided with a steering pivot pin 13 which is a tight press fit in the bore, projecting above and below the eye 11. The pin 13 is provided with an integral radial flange 14, the upper face of which abuts the lower face of the eye 11, thus determining the axial position of the pin therein.

Pivotally mounted on the projecting extremities of the pin 13 is a knuckle member 16 forming a housing outwardly convex in section, which partially encloses the said pin and the knuckle member or eye 11. This housing is provided with an integral wheel spindle 17 of the usual type, having spaced cylindrical portions 18 and 19 separated by a tapered portion 21. The outer end of the spindle 17 is threaded as at 22 for the wheel retaining nuts 23. Bearing races 24 and 26 are removably positioned on the cylindrical spindle portions 18 and 19 respectively and co-operate with bearing members 27 and 28, which are preferably of the taper-roller or other suitable anti-friction type. The bearing members 27 and 28 co-operate respectively with outer bearing races 29 and 31, which are suitably secured in a hub member 32 of the vehicle wheel 33. A ring 30 may be axially secured between the inner bearing abutment 24 and the outer face of the member 16 and arranged to carry the usual felt washer which co-acts with the rotatable wheel hub 32 to prevent the escape of lubricant and the entrance of dirt. As the bearing construction just described is well known in the art to which this invention relates, further description thereof is deemed unnecessary.

The hub member 32 is threaded at its outer end to removably secure thereto a suitable hub cap 34, adapted to enclose and protect the outer end of the spindle 21 and its retaining nuts 23 in the well known manner. The hub member 32 is also provided, intermediate its ends, with a radially disposed flange 36, adapted for the attachment of the vehicle wheel 33. In the embodiment herein described, this wheel 33 comprises a disk 37 of steel or other suitable material, provided at its center with a hole 38 adapted to pass over the outer end of the hub 32, and having an annular face adjacent the hole 38 adapted to fit against a co-operating face 39 on the flange 36. This flange 36 is provided with a row of axially disposed holes 41 which are threaded for co-operation with suitable bolts 42, by means of which the wheel disk 37 is secured to the flange 36 of the hub member 32. Spring lugs 43 may be interposed between the heads of the bolts 42 and the wheel disk 37 if desired. The periphery of the wheel disk 37 is provided with the usual tire supporting rim 44 on which a tire, such as is illustrated at 46, may be mounted.

The housing knuckle member 16 is provided with a marginal flange 47, extended at intervals to form lugs 48, and having an inwardly disposed plane face 49 which is adapted for contact with a circular brake supporting member or plate 51, arranged in a plane normal to the axis of the wheel spindle 17. This plate 51 is provided with a central opening 52 through which the axle knuckle member 11 passes, and it is secured to the lugs 48 at the mid portion of the flange by suitable bolts 53. The periphery of the plate 51 is arranged to lie just within the edge of a brake drum 54, of the usual dished construction, on the inner circumferential surface of which suitable brake shoes 56, having friction lining 57, are adapted to bear in the usual manner to retard the vehicle. The brake shoes 56 are pivoted in any suitable manner (not shown) to a lug 58, riveted or otherwise rigidly attached to the brake plate and are adapted to be oscillated on their pivot by any appropriate mechanism into engagement with the drum 54 in the well known manner. In the embodiment of the invention illustrated in the drawing, a hydraulic cylinder, indicated at 59 as mounted on the plate 51, is adapted to actuate the shoes 56, but it is to be understood that cams, toggles, levers or other well known mechanism may be used in place of the hydraulically actuated mechanism 59. The brake drum 54 has an annular face 61 adapted to bear against a shoulder 62 on the inner side of the hub flange 36 and is adapted to be removably secured thereto, preferably by the same bolts 42 which secure the wheel disk 37 to the hub.

The housing 16 has a lower portion 63 of cup-shaped configuration adapted to completely surround the downwardly projecting end of the pin 13 below the flange 14 thereof. The portion 63 is provided with a suitable bore 64 in which is mounted a bushing 66 adapted to directly engage the pin 13. The lower part of the bore 64 is adapted to receive a suitable thrust block 67, which is mounted for adjustment axially of the bore 64 in any convenient manner, as by means of the screw 68. The block 67 is adapted to co-act with the lower end 69 of the pin 13, to transmit to the housing 16, and subsequently through the hub 32, the wheel 37, and the tire 46, the downward thrust of the axle 10 resulting from the weight of the motor vehicle and its body. To this end the block 67 is provided with a concave upper surface adapted to co-operate with a corresponding convex lower end of the pin 13. A suitable lubricant retaining washer 70 may be secured between the upper face of the portion 63 and the lower face of the eye 11.

The upper portion of the housing 16 is adapted to partially surround a bearing member 69', having a plane inner face 71 which is clamped against the plate 51. A slight clearance is provided between the upper knuckle housing portion and the member 69', the latter being arranged to receive the upper end of the pin 10. Adjustment of the bearing member 69' axially of the pin 13 is provided by a plate or washer 72 arranged between the lower face of this bearing member and the upper face of the knuckle member 11, suitable shims 73 being inserted between the plate 72 and the member 11. The plate is prevented from oscillation with respect to the axle in any convenient way, as by dowelling it to the member 11. It will be understood that the inclination of the wheel with respect to its steering pivot may be varied somewhat by changing the axial position of the member 69' on the pin 13, the surface 71 of the bearing member constituting a wedged adjustment for this purpose. A cap 75 may be secured in the upper end of the bore of the member 69 to prevent leakage of lubricant from the lubricant ducts provided in the pin and in the bearings, and to prevent the entrance of dust and dirt.

The knuckle member 16 is provided near its upper end with a steering lever arm 74, having a base portion 76 formed with laterally disposed lugs 77. The inner face 78 of the base portion of the lever is adapted to seat against the brake supporting plate 51 at a point opposite the attachment thereto of the bearing member 69'. Suitable bolts 79 pass through the lugs 77, the plate 51, lugs 81 formed on the bearing member 69' and lugs 82 formed on the upper portion of the housing 16, rigidly clamping these members together. The other end of the lever arm 74 is provided with a ball pivot 83, arranged on a stud 84 which is mounted in an eye 86 at the end of the lever. The ball pivot 83 co-acts with a steering drag link 87 which is actuated from the vehicle steering gear in the well known manner.

The lower portion 63 of the housing 16 is provided with suitable lugs or ears 88 in which are mounted bolts 89, which pass through the brake supporting plate 51. These bolts 89 also pass through a steering lever arm 91, having an inner face 92 adapted to bear against and be clamped to the plate 51. In this way the lower portion of the housing 16 is rigidly clamped both to the brake plate 51 and to the arms 91. The outer portion of each of the arms 91 is provided with a suitable eye 93 by means of which they may be connected by the usual tie-rod (not shown) so that the front wheels 37 of the vehicle may be turned together on their pivots. A stop screw 94, mounted in a suitable lug 96 in the web portion of the axle 10 may be used to limit the arc through which the wheels may be swung on their pivots, the head of this screw being adapted to contact the plate 51 and the housing 16 when the wheels are swung into hard-over position, as clearly illustrated in Fig. 2.

As previously mentioned the pivot pin 10 and the arms 74 and 91 are provided with suitable lubricant passages which are connected to each other and to the various bearings of these members by appropriate ports and ducts, so that lubricant introduced at one point of the system will be communicated thereto to all the associated bearings in a manner well understood in the art of this invention.

Disassembly of the steering structure provided by this invention can be quickly and easily effected after disconnection of the brake operating means, by removal of the bolts 53, 79 and 89, it being understood that the axle 10 is jacked up or otherwise suitably supported to take the weight of the vehicle. The brake plate 51 may then be swung inwardly over the axle, and the bearing member 69' may be lifted off the upper end of the pivot pin 13, this operation being expedited by reason of the clearance between these members. The lower portion 63 of the housing may then be lowered from the downwardly projecting end of the pin 13, or the axle and pin may be raised upwardly out of this member.

It will be evident that the elements of this steering connection are simple in structure and are easily machined; the device thus provided being strong as well as inexpensive to manufacture.

It will be understood that various forms of the invention other than those described above may be used without departing from the spirit or scope of the invention.

What is claimed is:

1. The combination in a motor vehicle having wheels, an axle and an inclined pin rigidly secured in each end thereof, of a bearing on each pin above and below the axle, a housing connecting the bearings and adapted for support by the vehicle wheel, and a brake supporting plate secured to the housing, the upper bearing being clamped between said housing and plate.

2. The combination in a motor vehicle having an axle, of a pivot pin rigidly secured in each end of said axle and projecting above and below the same, bearings for the upper and lower portion of each pin, a housing having a cup-shaped portion to enclose the lower bearing, said portion having thrust absorbing means for the pin, and a brake supporting plate secured to said housing, the said upper bearing being clamped between the housing and said plate.

3. The combination in a motor vehicle having an axle, of a pivot pin rigidly secured in each end of said axle and projecting above and below the same, bearings for the upper and lower projecting portion of each pin, a housing having an integral wheel spindle, a socket on the housing to receive the lower bearing, a brake supporting plate, and means for removably securing said upper bearing between said plate and said housing.

4. The combination in a motor vehicle having an axle and a wheel supporting said axle, of a pivot pin fixed in said axle, a knuckle member having an integral wheel spindle, bearings for the pin, a brake supporting plate, means clamping one of the bearings between the knuckle member and said plate, and a socket for the other bearing.

5. The combination in a motor vehicle having an axle and a wheel supporting said axle, of a pivot pin on said axle, a knuckle member having bearings rotatably mounted on said pin, a plate, means including arms for swinging the knuckle member and the plate about said pin, and means clamping said plate between said arms and the knuckle member.

6. The combination in a motor vehicle having an axle and wheel, of a pivot pin, a knuckle member having an integral spindle for said wheel and partially surrounding said pivot pin, a brake supporting plate removably secured to the knuckle member at one side of the pin, and bearings secured between said knuckle member and said plate.

7. The combination in a motor vehicle having an axle, of an inclined pivot pin in each end thereof, a knuckle member adapted to enclose the lower part of the pin and to partially enclose the upper part thereof, a vertical plate adjacent said knuckle member, a bearing on the upper portion of the pin secured between the said member and the plate, and means removably securing the lower portion of said member to the plate.

8. The combination in a motor vehicle having an axle with an inclined pivot pin therein, of a knuckle member adapted to partially enclose the pin, a plate removably secured to the knuckle member, and a bearing member for said pin, adjustable axially thereon adapted to be clamped between said knuckle member and said plate.

9. The combination in a motor vehicle having an axle, of an inclined pivot pin in the end thereof, a knuckle member adapted to partially enclose the pin, a plate adjacent the knuckle member disposed at an angle to said pin, a bearing member surrounding the upper part of the pin and adjustable axially thereof, said bearing member having a face engaging said plate, and means clamping the bearing member in adjusted position between the knuckle member and said plate.

10. The combination in a motor vehicle having an axle with an inclined pivot pin, of a plate adjacent said pin and having an opening through which the axle projects, a dished knuckle member co-operating with the plate to surround the pin, and bearings on said pin between the plate and the knuckle member.

In testimony whereof I affix my signature.

JESSE G. VINCENT.